S. C. KETCHUM.
Mincing Knife.
No. 65,233.    Patented May 28, 1867.
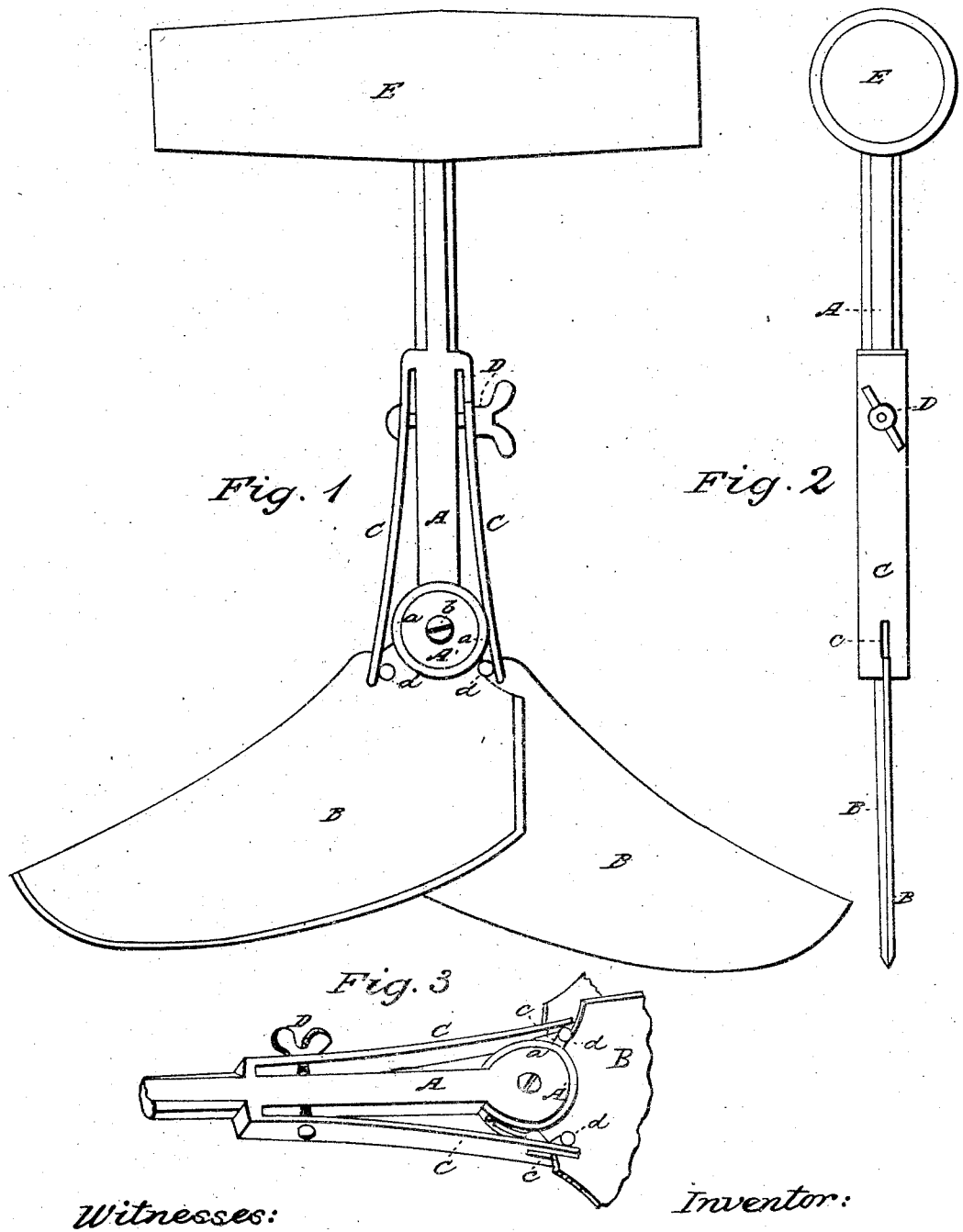

United States Patent Office.

STEPHEN C. KETCHUM, OF WINCHENDON, MASSACHUSETTS.

Letters Patent No. 65,233, dated May 28, 1867

IMPROVED MINCING-KNIFE.

*The Schedule referred to in these Letters Patent and making part of the same.*

TO ALL WHOM IT MAY CONCERN:

Be it known that I, STEPHEN C. KETCHUM, of the town of Winchendon, in the county of Worcester, in the State of Massachusetts, have invented certain new and useful improvements in Chopping or Mincing-Knives; and the following is a full, clear, and exact description of the same, reference being had to the accompanying drawings, making a part of this specification, in which—

Figure 1 represents a side view of my improved chopping-knife.

Figure 2 shows an edge view of the same.

Figure 3 shows a perspective view, with the blades and shank broken off.

The object of my invention is to facilitate the process of chopping or mincing, by giving a drawing stroke to the cutters, and consists in the construction and arrangement of a double-bladed chopping-knife, the blades being so pivoted to the shank as to give a drawing stroke on the substance to be minced, and at the same time conform to the curve or shape of the bowl or tray; the cutting-blades being held in such a position, by springs made adjustable with a thumb-screw and nut, that any required stiffness to the action of the blades may be obtained.

To enable others to make and use my invention, I will describe it more fully, referring to the drawings, and to the letters marked thereon.

I make the handle-shank A of iron or steel, with a slit or opening, a a, in the lower end A', into which are fitted the knives or cutting-blades B B, they being secured by the pivot or screw b in such manner as to allow them to be moved on the pivot, as the edge of the blades are brought in contact with and pressed upon any substance. In order to make the cutting-blades B B operative, and give them efficiency, I secure to the shank A, on both sides, steel springs C C, which have slits c c in their lower ends to pass on to the upper edges of the cutting-blades B B, where they have bearings or pins d d, so that the blades are always kept in the position to give a drawing cut whenever the instrument is pressed or forced down on to the substance; and any desired force can be applied to the action of the blades by the bolt and thumb-nut D operating on the springs C C for that purpose. To the upper end of the shank A a turned handle, E, of hard wood, is put on, so that the chopping-knife is used by hand in the usual manner.

The advantages of my improvement will be readily seen and easily understood, as it is a well-known fact that any substance, and especially meat, is much easier cut by a drawing stroke; and other advantages are, that the cutting edges conform to the concave or curve of the bowl or tray that is used for the purpose of mincing.

Having thus fully described my invention, what I claim as new, and desire to secure by Letters Patent, is—

1. A double-bladed chopping-knife, the blades being so pivoted to the shank as to give a drawing cut at each stroke, substantially as described.

2. I claim so hinging two or more blades or knives together, and supporting them in such a position with springs, as to allow the cutting edges to conform to any suitable concave, or the curves of a chopping-tray or bowl, as herein described.

3. I claim the combination of the cutting-blades B B, fulcrum-pins d d, shank A, springs C C, with the bolt and thumb-nut D, operating in the manner herein described, for the purposes set forth.

In testimony whereof I hereunto set my hand this 26th day of March, 1867.

STEPHEN C. KETCHUM.

Witnesses:
E. S. MERRILL,
E. PITKIN.